United States Patent
Morris et al.

(10) Patent No.: US 8,873,254 B2
(45) Date of Patent: Oct. 28, 2014

(54) ISOLATED FLYBACK CONVERTER WITH SLEEP MODE FOR LIGHT LOAD OPERATION

(75) Inventors: John D. Morris, Sunnyvale, CA (US); Michael G. Negrete, Mountain View, CA (US); Min Chen, Milpitas, CA (US)

(73) Assignee: Linear Technology Corporation, Milpitas, CA (US)

( * ) Notice: Subject to any disclaimer, the term of this patent is extended or adjusted under 35 U.S.C. 154(b) by 304 days.

(21) Appl. No.: 13/418,285

(22) Filed: Mar. 12, 2012

(65) Prior Publication Data

US 2013/0235620 A1    Sep. 12, 2013

(51) Int. Cl.
*H02M 3/335*    (2006.01)

(52) U.S. Cl.
USPC ........................................ 363/21.14

(58) Field of Classification Search
CPC ............................... H02M 3/335; Y02B 70/16
USPC ............... 363/20, 21.08, 21.12, 21.13, 21.14, 363/21.16, 21.17
See application file for complete search history.

(56) References Cited

U.S. PATENT DOCUMENTS

| | | | |
|---|---|---|---|
| 5,305,192 A | 4/1994 | Bonte et al. | |
| 5,912,552 A * | 6/1999 | Tateishi | 323/285 |
| 7,463,497 B2 | 12/2008 | Negrete | |
| 7,639,517 B2 | 12/2009 | Zhou et al. | |

* cited by examiner

*Primary Examiner* — Adolf Berhane
*Assistant Examiner* — Yemane Mehari
(74) *Attorney, Agent, or Firm* — Patent Law Group LLP; Brian D Ogonowsky

(57) ABSTRACT

A flyback converter uses primary side sensing to sense the output voltage for regulation feedback. A comparator on the primary side detects whether the output voltage has exceeded a predetermined regulated voltage by a first threshold to detect an over-voltage condition, resulting from a current generated by the converter exceeding the load current. Triggering of the comparator causes the converter to enter a non-switching sleep mode, whereby the output voltage droops over a period of time. When the output voltage has drooped below the predetermined regulated voltage by a second threshold, a synchronous rectifier is controlled to turn on, then off, to generate a pulse in the primary winding. Upon detection of the pulse, the sleep mode is terminated, and normal operation resumes until a regulated voltage is achieved or until the first threshold is again exceeded by the output voltage.

25 Claims, 5 Drawing Sheets

ISOLATED FLYBACK CONVERTER WITH SLEEP MODE FOR LIGHT LOAD OPERATION

FIELD OF THE INVENTION

This invention relates to DC-DC flyback converters using a synchronous rectifier and, in particular, to such a flyback converter that uses primary side sensing to detect an output voltage.

BACKGROUND

DC-DC flyback converters using synchronous rectifiers are well known. When isolation between the input and output stage is required, the output voltage can be sensed by various methods for regulation feedback. Some ways to convey the output voltage while maintaining isolation include using an optocoupler or using an auxiliary winding on the primary side of the transformer. However, those ways require additional circuitry, space, power, and cost.

A more elegant way of detecting the output voltage is to sense a voltage at a terminal of the power switch when the power switch is off during the discharge (or flyback) cycle of the converter. The voltage at the terminal of the power switch is generated due to a current flow in the secondary winding. Such a sensed voltage is substantially equal to the input voltage plus N*VOUT, where N is the winding ratio of the primary and secondary windings. (The voltage drop across the synchronous rectifier is ignored for simplicity.) However, such a scheme requires a minimum duty cycle in order for the sensing to be accurate, since current must periodically flow in the secondary winding in order to create the primary side sense voltage. Such a scheme also generally requires a minimum load in the form of a load resistor so as to draw a minimum current during the discharge cycle in the event the actual load is in a standby mode drawing little or no current.

If there were no minimum load resistor and the actual load went into a very light current standby mode or was disconnected, the minimum duty cycle may be greater than that needed to achieve a regulated output voltage, and the output voltage would exceed the desired regulated level. Thus, the minimum load current must be above a threshold current to prevent this. The minimum load resistor reduces the efficiency of the converter.

Although the converter may be controlled to switch at even lower duty cycles to lower the minimum load current that it can generate, such lowering of the duty cycle reduces the converter's ability to react to load current transients. For example, if the load suddenly drew an increased current during a switching cycle, the output voltage may droop below a threshold for proper operation of the load before the output was sensed in the following cycle.

FIG. 1 illustrates one type of flyback converter 10 that uses a minimum load resistor R1 and which detects the output voltage VOUT by detecting the voltage at the primary winding L1 when the synchronous rectifier MOSFET M2 is turned on during the discharge (or flyback) cycle. No optocoupler or auxiliary winding is used to detect VOUT.

A transformer 12 has a primary winding L1 and a secondary winding L2. The MOSFET M1 is controlled by an output regulation and control circuit 14 to connect the winding L1 between the input voltage VIN (e.g., a battery voltage) and ground during a charging cycle.

To achieve a regulated VOUT, the MOSFET M1 is turned off after a controlled time, and the synchronous rectifier MOSFET M2 is turned on. The current through winding L2 is transferred to the load and the smoothing capacitor C1 at the required voltage.

For regulation feedback, the circuit 14 detects the voltage at the drain of MOSFET M1 during the discharge cycle (current flowing through winding L2), where such a voltage is related to VOUT. Sensing an output voltage by a signal at the primary side of the transformer is sometimes referred to as primary side sensing. The user selects the value of a feedback resistor RFB and the value of a reference resistor RREF such that (RFB/RREF)*Vref equals the desired regulated voltage, where Vref is a bandgap reference voltage applied to an error amplifier. Such primary side sensing circuits for detecting VOUT are well known and need not be described in detail. The full data sheets for the Linear Technology LT3573 and LT3748 flyback converters, incorporated herein by reference and available on-line, describe the operation of the feedback circuit. This operation is also described in U.S. Pat. Nos. 7,471,522 and 7,463,497, assigned to the present assignee and incorporated herein by reference. Other known primary side voltage sensing techniques may be used.

The circuit 14 continues to control the duty cycle of MOSFET M1, at a variable frequency or a fixed frequency, to regulate VOUT based on the sensed voltage.

A synchronous switch control circuit 16 may control MOSFET M2 to turn on at the proper times or, alternatively, the circuit 14 may directly control the synchronous rectifier MOSFET M2 to turn on when MOSFET M1 turns off. MOSFETs M1 and M2 are typically never on at the same time. The diode D2 represents the drain-body diode of the MOSFET M2. Many conventional techniques may be used to sense when to turn the MOSFET M2 on. In one embodiment, the synchronous switch control 16 detects a voltage across the MOSFET M2. When the MOSFET M1 switches off, the voltage across MOSFET M2 will become negative (drain voltage lower than ground), and this sensed voltage reversal causes the synchronous switch control circuit 16 to turn on MOSFET M2. When the secondary winding L2 current ramps down to zero, the drain voltage will rise, causing the synchronous switch control circuit 16 to turn off the MOSFET M2. With each cycle of MOSFETs M1 and M2 turning on and off, a current pulse is provided to the output, which is smoothed by the capacitor C1 to generate a DC regulated output voltage VOUT.

Various other conventional schemes may also be used to control the turning on and off of the MOSFET M2 to emulate a diode.

The output regulation and control circuit 14 may use any type of conventional technique to regulate, including current mode, voltage mode, or other modes.

When the load current is above a certain threshold current, conventional operation of the converter 10 is used to accurately regulate VOUT. However, when the actual load current falls below a threshold current, the required minimum duty cycle of the converter 10 generates too much current and causes VOUT to rise above the regulated voltage. Such light load operation still requires a minimum duty cycle to sample the voltage at the primary winding L1. In the event that the actual load is a type that has a standby mode that draws very little power, the converter 10 is provided with a minimum load current resistor R1 to help dissipate the winding L2 current so regulation can be maintained at the minimum duty cycle. Alternatively, or in conjunction, a zener diode D3 is used to ensure VOUT does not rise above a threshold level. Resistor R1 and zener diode D3 are optional, since the minimum current drawn by the actual load may be sufficient to substantially maintain regulation at the lightest load current.

FIG. 2 illustrates the current $I_{L1}$ through the primary winding L1, the current $I_{L2}$ through the secondary winding L2, and the voltage VD at the drain of the MOSFET M1 for a relatively low duty cycle operation.

At time T1, the MOSFET M1 turns on to charge the primary winding L1, causing a ramping current to flow in winding L1. MOSFET M2 is off at this time.

After a variable or fixed time, at time T2, MOSFET M1 shuts off and MOSFET M2 turns on. This may be at the minimum duty cycle. This ceases current in the primary winding L1 and causes the current through the secondary winding L2 to ramp down while charging the output capacitor C1 and providing current to the load. During this discharge cycle, the voltage across the MOSFET M1 is related to the output voltage VOUT and is sampled during this time by the circuit 14.

At time T3, the secondary winding L2 current ramps down to zero and the MOSFET M2 turns off to cause a discontinuous mode. The MOSFET M2 may be turned off by a circuit that detects a slight reversal of current through the winding L2 by detecting the voltage across the MOSFET M2.

After time T3, the parasitic capacitance of MOSFET M1 and the inductance of winding L1 create an oscillating tank circuit, and the settled voltage across the MOSFET M1 is VIN.

At time T4, the MOSFET M1 turns on again, and the cycle repeats, which may be the minimum duty cycle.

Additional detail of various converter circuits are described in U.S. Pat. Nos. 5,481,178; 6,127,815; 6,304,066; and 6,307,356, assigned to the present assignee and incorporated herein by reference.

During a medium to high current mode of the converter 10, the converter 10 varies the duty cycle or the peak or average current in winding L1 to regulate the output voltage.

During a light load condition, such as a standby mode, it is important that the converter 10 draw as little current as possible to increase system efficiency or extend battery life. Such standby modes typically occur for relatively long periods. It would be desirable to not require a minimum current load circuit (e.g., resistor R1) or a minimum duty cycle at light load currents to enable the converter 10 to regulate VOUT when the actual load is in its standby mode. By doing away with the minimum current circuit or minimum duty cycle, while still achieving substantial regulation when the actual load is drawing zero or very little current, efficiency would be improved and battery life would be increased. Further, in any converter solution, it would be desirable to retain good transient response.

SUMMARY

A flyback converter is disclosed that uses primary side sensing to sense the output voltage VOUT but does not need a minimum duty cycle and does not need a minimum load current resistor or zener diode to control overvoltages during light load conditions. The invention relates to a low current mode of operation. The converter may use any technique for regulating the output voltage during high to medium load currents, such as any combination of current mode, voltage mode, continuous conduction mode (CCM), boundary conduction mode (BCM), discontinuous conduction mode (DCM), fixed frequency, variable frequency, etc.

For very low load currents, when the converter operates at a very low duty cycle, there is a necessary delay between turning on the power switch and turning it off due to the need to periodically sample the output voltage with the feedback circuit. This means that, if the load is drawing less current than provided during the minimum on-time, the output voltage will rise. If the power switch were turned on at the beginning of each clock cycle, VOUT would continue to increase.

The present invention implements a sleep mode in an isolated flyback converter, using primary side sensing, that forces the power switch to stay off for relatively long periods of time when it is detected that VOUT exceeded a certain threshold above the nominal regulated voltage level during the low load condition.

Once the primary side sensing detects that VOUT has exceeded the threshold above the nominal regulated voltage level, the output regulation and control circuit (on the primary side) disables the power switch and any non-essential circuitry so that it does not turn on at the beginning of each clock cycle (or at its conventional turn on time). Thus, a sleep mode is initiated where no further current pulses are provided to the output capacitor, and VOUT slowly droops due to leakage current or a low load current. At the secondary side of the regulator, a comparator detects whether the drooping VOUT has fallen to a certain threshold below the nominal regulated voltage level. At that point, the synchronous rectifier is briefly turned on by a synchronous switch control circuit, which draws a brief negative current through the secondary winding. Although this slightly further reduces VOUT, the reduction can be minimized. This pulse causes the voltage at the drain of the power switch MOSFET to increase to approximately VIN+(N*VOUT), where N is the primary-secondary winding ratio, which is sensed by the primary side sensing circuit.

An alternate method to sense the pulse is to sense the brief current pulse through the primary winding and the drain-body diode of the power switch MOSFET after the secondary switch turns off. This may be done by measuring the voltage across a low value sense resistor in series with the MOSFET or by detecting that the drain voltage is less than zero volts.

The detection of this pulse (either the voltage pulse or current pulse) during the sleep mode re-enables normal power switch operation until the nominal regulated voltage level is achieved. If the load current remains very low, the converter then operates at a minimum duty cycle and VOUT will again eventually exceed the threshold above the nominal regulated voltage level, at which time the sleep mode occurs again. Accordingly, VOUT is kept between the two thresholds during the low load current operation without the need for any minimum load resistor or zener diode.

Although the switching is temporarily halted during the sleep mode, the transient response to load changes is still adequately controlled by regulating the output voltage between two thresholds.

The sleep mode technique may be used in conjunction with all types of primary side sensing circuits and with any suitable operating mode.

Although the disclosed embodiment employs primary side sensing by detecting the voltage at the drain of a MOSFET switch, the primary side sensing may also be implemented by detecting the voltage across an auxiliary winding on the input side, where the voltage is related to the voltage across the secondary winding, or with any other type of primary side sensing technique. The pulse for waking from the sleep mode may then be sensed at the primary winding or the auxiliary winding.

BRIEF DESCRIPTION OF THE DRAWINGS

Elements that are the same or equivalent are labeled with the same numeral.

DETAILED DESCRIPTION

Figure 1:
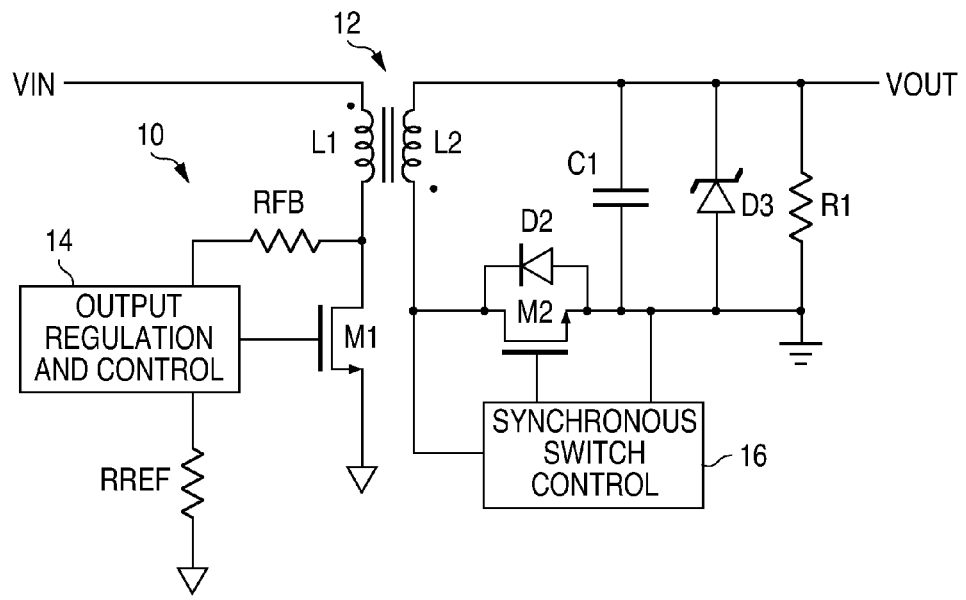
FIG. 1 illustrates a prior art flyback converter.
Figure 2:
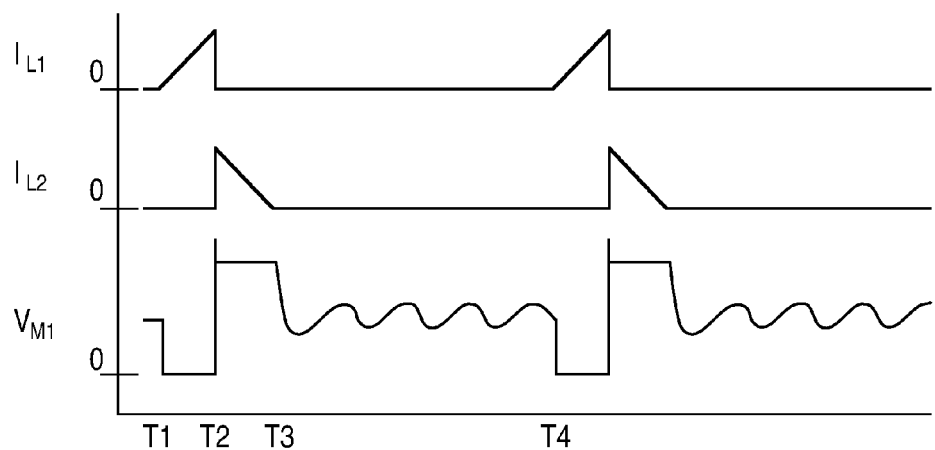
FIG. 2 illustrates the currents through the windings of the transformer in FIG. 1 as well as the voltage across the power switch when the converter provides a light load current.
Figure 3:
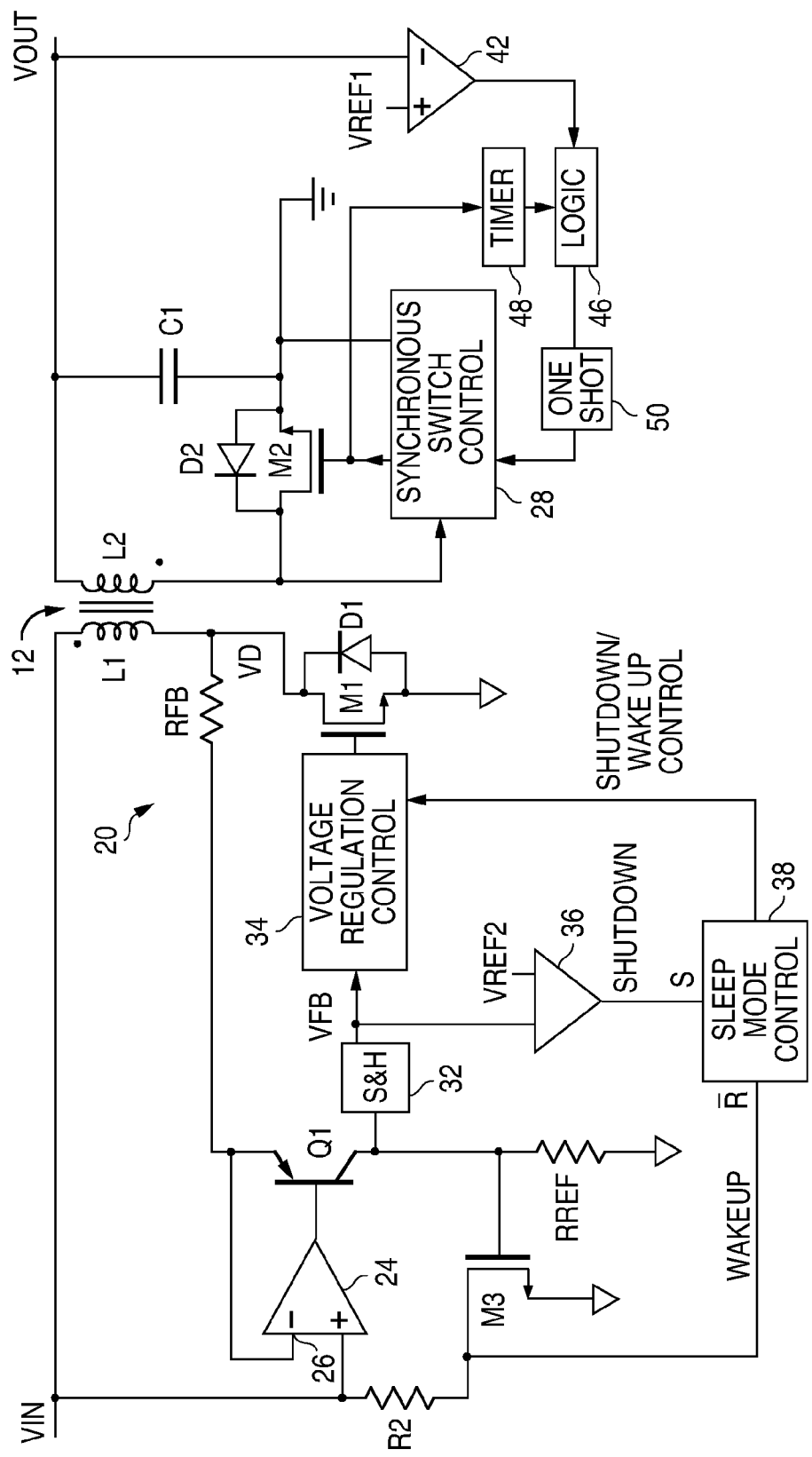
FIG. 3 illustrates a flyback converter employing the present invention, where the converter enters a sleep mode when an over-voltage condition is detected due to low or no load current.

FIG. 3 represents any of the many types of flyback converters using primary side sensing of the output voltage VOUT. Since the invention only relates to operation of the converter during a low load current condition when an overvoltage occurs, any conventional aspects of flyback converters may be used for medium to high load currents. Since such conventional circuitry is well known, and there are a variety of types, such a current mode, voltage mode, variable frequency, fixed frequency, etc., there is no need to describe such conventional circuitry in detail. The description of the conventional aspects of the converter 10 of FIG. 1 applies to the converter 20 of FIG. 3.

For medium to high load current operation, the converter 20 periodically turns the MOSFET M1 on to charge the primary winding L1. The duty cycle or peak current of the MOSFET M1 is dependent on a feedback voltage at the drain of the MOSFET M1 related to VOUT, which is sampled at a certain time when the synchronous rectifier MOSFET M2 is on and current is flowing through the secondary winding L2. The feedback voltage is used to create a value, using resistors RFB and RREF, that is sampled and compared to a reference voltage applied to an error amplifier in the voltage regulator control circuit 34. The error signal generated by the error amplifier sets the on-time of the MOSFET M1 during a cycle i.e., sets the duty cycle or peak current) such that the voltages applied to the inputs of the error amplifier are equal. The error amplifier and the operation of the converter 20 at medium and high currents may be conventional.

In FIG. 3, when current is flowing through the secondary winding L2, the voltage at the node of the resistor RFB and the primary winding L1 is about VIN+(N*VOUT), where N is the ratio of the number of turns in winding L1 divided by the number of turns in winding L2. The small voltage drop across the MOSFET M2 is ignored for simplicity. This node is also the drain voltage (VD) of the MOSFET M1.

An op amp 24 in the feedback loop causes the voltage at its inverted input 26 to be approximately VIN. Accordingly, the current through the resistor RFB and the PNP transistor Q1 is (VD-VIN)/RFB, and the voltage across the resistor RREF is (VD−VIN)*RREF/RFB. This voltage varies due to the cycling of the MOSFETs M1 and M2 and must be sampled at a certain time in the cycle when the MOSFET M2 or diode D2 is on to provide an accurate reading of VOUT. This sampling time can eliminate resistive or diode drop errors if it is at the time that the current though the secondary winding L2 has ramped down to approximately zero.

Figure 4:
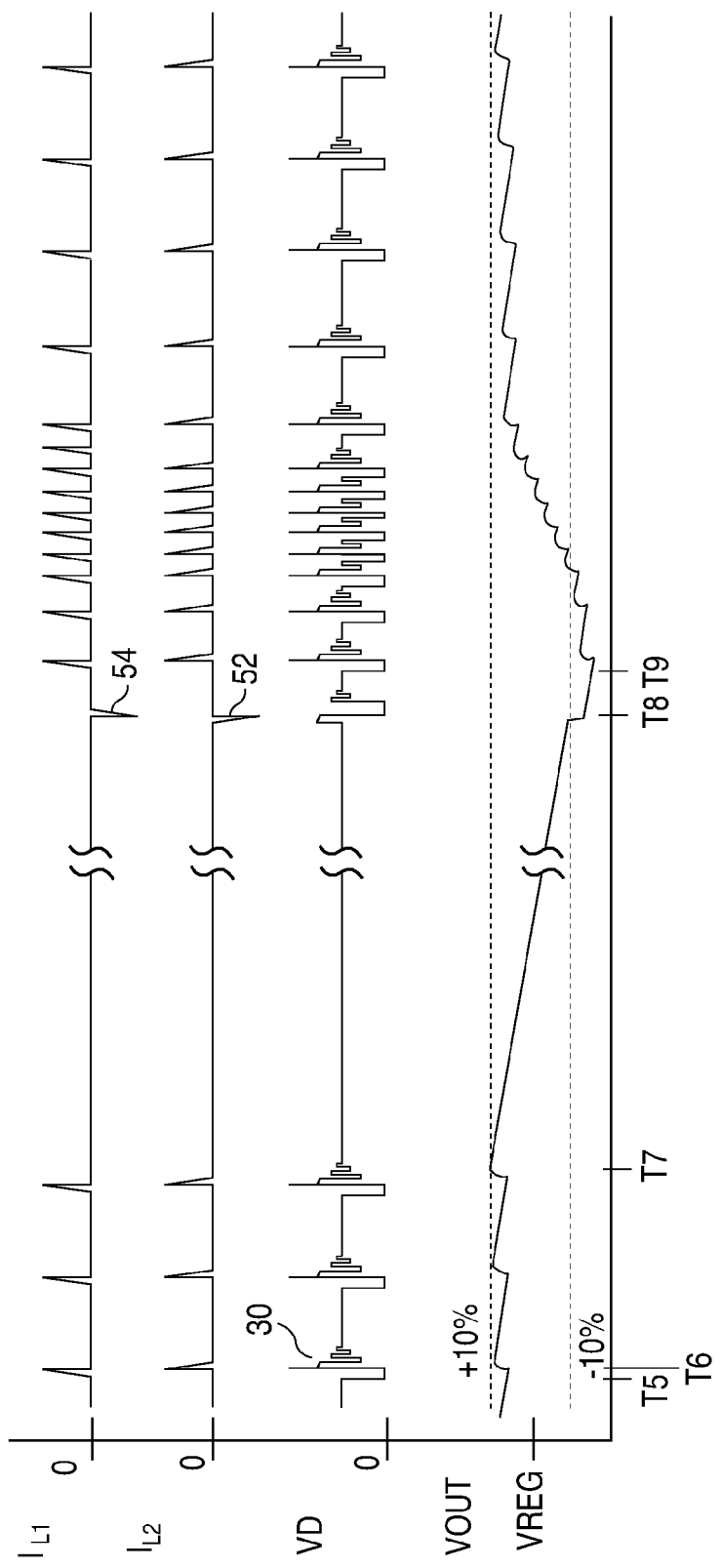
FIG. 4 illustrates the currents through the windings of the transformer in FIG. 3, the voltage across the power switch, and the output voltage at low loads prior to, during, and after a sleep mode.

FIG. 4 illustrates the currents through the windings of the transformer 12 in FIG. 3, the voltage VD across the MOSFET M1, and the output voltage VOUT at light loads prior to, during, and after a sleep mode.

At time T5, the MOSFET M1 turns on to generate a ramped current $I_{L1}$ through the primary winding L1. At time T6, the MOSFET M1 is turned off and the MOSFET M2 is turned on. This may be the minimum duty cycle of the converter 20 for enabling the periodic sampling of the output voltage. When the current through the secondary winding L2 is approximately zero, the MOSFET M2 is turned off by the synchronous switch control circuit 28.

The sampling of the voltage at resistor RREF is preferably taken at the knee 30 of the voltage VD, which occurs at approximately the time that the MOSFET M2 turns off.

A sample & hold circuit 32 detects the peak voltage at the time the knee 30 occurs. Sample & hold circuits that detect a peak voltage then hold the peak voltage until they are reset are well known. Sampling such a knee voltage for primary side sensing in a flyback converter is described in U.S. Pat. Nos. 5,305,192; 7,463,497; and 7,639,517, all incorporated by reference.

The sample & hold circuit 32 supplies this feedback voltage VFB (or a divided VFB) to a voltage regulation control circuit 34, which may be conventional. In one embodiment, the voltage regulation control circuit 34 comprises an error amplifier that receives VFB at an inverting input and receives a bandgap reference voltage (e.g., 1.22 volts) at a non-inverting input. The converter 20 controls the duty cycle of the MOSFET M1 to equalize the inputs into the error amplifier, which is conventional.

If the converter 20 is a current mode type, the output of the error amplifier is applied to one input of a comparator, and the other input corresponds to a ramping current through the MOSFET M1. A low value sense resistor in series with MOSFET M1 may be used to sense the current. When the current ramp reaches the limit corresponding to the error voltage, the MOSFET M1 is shut off.

In another embodiment, the converter 20 is a voltage mode type where the voltage regulation control circuit 34 compares the error signal to a sawtooth waveform. When they cross, the MOSFET M1 is turned off to establish the duty cycle needed to precisely regulate the voltage.

The MOSFET M1 may be turned back on at a fixed frequency or at a variable frequency.

All these regulation techniques, for medium to high load currents, may be conventional. In the particular example used in FIG. 4, the duty cycle is controlled by varying the off time of the MOSFET M1.

The novel operation of the converter 20 in sleep mode will now be described.

As shown in FIG. 4, prior to time T5, the load current has been less than the minimum current delivered by the converter 20, and the output voltage VOUT has been steadily increasing above the nominal regulated voltage (VREG) with each cycle due to the current provided at the minimum duty cycle being greater than the load current. At time T5, the MOSFET M1 turns on and, at time T6, the MOSFET M1 turns off after a minimum on time. The minimum duty cycle is used to periodically sample the output voltage.

A threshold of VREG+10% is set for triggering the sleep mode, but any value may be used. In FIG. 4, this threshold is set by applying a suitable VREF2 to one input of a comparator 36. The other input is connected to VFB. Once the comparator 36 triggers at time T7, it sends a set signal to a sleep mode control latch 38. In response, the sleep mode control latch 38 controls the voltage regulation control circuit 34 to shut down or otherwise become disabled. This may be done by turning off a switch supplying power to the voltage regulation control circuit 34. The sample & hold circuit 32 and other non-essential circuits may also be shut down in the sleep mode. Accordingly, the MOSFET M1 is prevented from turning on.

Between times T7-T8, it is assumed that the load is minimal and may be in standby mode or disconnected and there is very little leakage current. During this time, VOUT slowly droops. T7-T8 may be on the order of milliseconds or many minutes. In another scenario, VOUT slowly droops until the load comes out of its standby mode and suddenly draws current to quickly lower VOUT.

At time T8, VOUT crosses the lower threshold of VREG-10%, as an example. This is detected by the comparator 42 on the output side of the converter 20, where VOUT (or a divided VOUT) is coupled to one input of the comparator 42 and VREF1 is coupled to the other input. The output of the comparator 42 is connected to a logic circuit 46 (e.g., an AND gate). Another input of the logic circuit 46 is coupled to the output of a timer 48. The timer 48 detects the length of time that MOSFET M2 is on during a cycle. If the length of time is below a brief threshold, the timer 48 outputs a signal (e.g., a high signal) representing that the duty cycle is low and thus there is a light load condition. If the timer 48 detects that the duty cycle is high (MOSFET M2 is on for a relatively long time), indicating that the secondary winding L2 delivered a high current during the cycle, the timer 48 outputs an inverse signal (e.g., a low signal) representing that the low VOUT is due to the load drawing more current than can be provided at the maximum duty cycle. Under that high load condition, the signaling by MOSFET M2 that normally ends the sleep mode is prevented from occurring. The timer 48 is optional and, if its function is desired, it may be replaced with various other types of circuits.

Thus, when the outputs of the comparator 42 and timer 48 are both high, the logic circuit 46 outputs a high signal to a one shot 50. The one shot 50 outputs a very short pulse having a fixed duration. This short pulse is coupled to the conventional drive circuitry in the synchronous switch control circuit 28 to turn the MOSFET M2 on for the pulse duration. The drive circuitry may be connected to an OR gate so as to be controlled by either the one shot 50 or the conventional part of the synchronous switch control circuit 28 that automatically turns the MOSFET M2 on upon detecting the reversal of the primary winding L1 voltage (MOSFET M1 shuts off) and automatically turns the MOSFET M2 off when the current through the secondary winding L2 reaches zero.

When the one shot 50 briefly turns on the MOSFET M2, at time T8, there is a short reverse current flow (pulse 52 in FIG. 4) through the secondary winding L2, further lowering VOUT, as shown in FIG. 4. Therefore, the pulse should be as short as practical. Alternatively, the MOSFET M2 may be turned off after a certain reverse current level is reached.

The brief turning on, then shutting off, of the MOSFET M2 when the over-voltage is detected is for the purpose of generating a detectable pulse at the primary winding L1. This pulse may be detected as a reverse current pulse (pulse 54) through the primary winding L1 and the drain body diode D1 of the MOSFET M1 after MOSFET M2 turns off or the pulse may be detected as the voltage VD rising to VIN+(N*VOUT) while MOSFET M2 is on. FIG. 4 illustrates circuitry to detect the voltage pulse at VD, which corresponds to a pulse at the resistor RREF. This short pulse briefly turns on the MOSFET M3, which pulls down the reset-bar terminal of the sleep mode control latch 38 to reset the latch 38. Resistor R2 is a high value resistor used to pull up the reset-bar terminal when the MOSFET M3 is off or could represent any pull-up current source.

If, instead of a voltage pulse being detected, a current pulse was to be detected through the primary winding L1, the voltage across a low value sense resistor in series with the MOSFET M1 may be sensed by a differential amplifier and the voltage pulse output by the amplifier applied to the reset terminal of the sleep mode control latch 38. Alternatively, a differential amplifier could be used to detect the voltage VD at the drain of MOSFET M1 going below ground when body diode D1 conducts, similarly sending a voltage pulse to the sleep mode control latch 38.

Upon the latch 38 being reset, the latch 38 sends a signal to the voltage regulation control circuit 34 to wake up. This may be by controlling a transistor switch to reapply power to the voltage regulation control circuit 34 and any other circuitry which may have been turned off in the controller 20.

At time T9, the MOSFETs M1 and M2 begin to switch again, in their normal regulating manner, to incrementally raise VOUT.

Initially, the error voltage (typically referred to as a compensation voltage VC at the output of the conventional error amplifier) is at a minimum voltage, where the minimum voltage represented the over-voltage state at time T7. After one switching cycle, the sample & hold circuit 32 detects the low VOUT and, as a result, the voltage regulation control circuit 34 operates at an increased duty cycle or current limit to quickly ramp up VOUT to achieve the nominal regulated voltage VREG. In the particular example of FIG. 4, the converter 20 uses a variable off time of the MOSFET M1 to control the output current so, at high duty cycles, such as when a low VOUT is detected, the MOSFET M1 is caused to switch at its maximum frequency. For other regulating schemes, the switching of the MOSFET M1 may be at a fixed frequency. The error voltage may alternatively start at a higher value than what it last was in order to ramp up VOUT more quickly.

If the load current remains light or zero, VOUT will again incrementally increase, even at the minimum duty cycle, from time T9 to eventually exceed the threshold necessary to trigger the comparator 36 to cause the converter 20 to again enter the sleep mode. The process then repeats.

By not switching the MOSFET M1 for the sleep mode period and turning off non-essential circuitry, the converter 20 greatly improves its efficiency. This is a result of quiescent current being reduced and no power delivered to the VOUT terminal when it is not needed. No minimum duty cycle is required at light load currents and no minimum load or output voltage clamp is required. The converter 20 quickly reacts to load transients (such as the load suddenly drawing more power) since it wakes up from sleep mode as soon as VOUT droops below the threshold.

Many other types of detectors and logic may be used to detect the over-voltage for triggering the sleep mode.

In another embodiment, the over-voltage detected by the comparator 36 triggers a sleep mode state machine that is programmed to control various aspects of the converter 20 going into and out of the sleep mode. Many variations of the example of FIG. 3 may be used to implement the invention.

Figure 5:
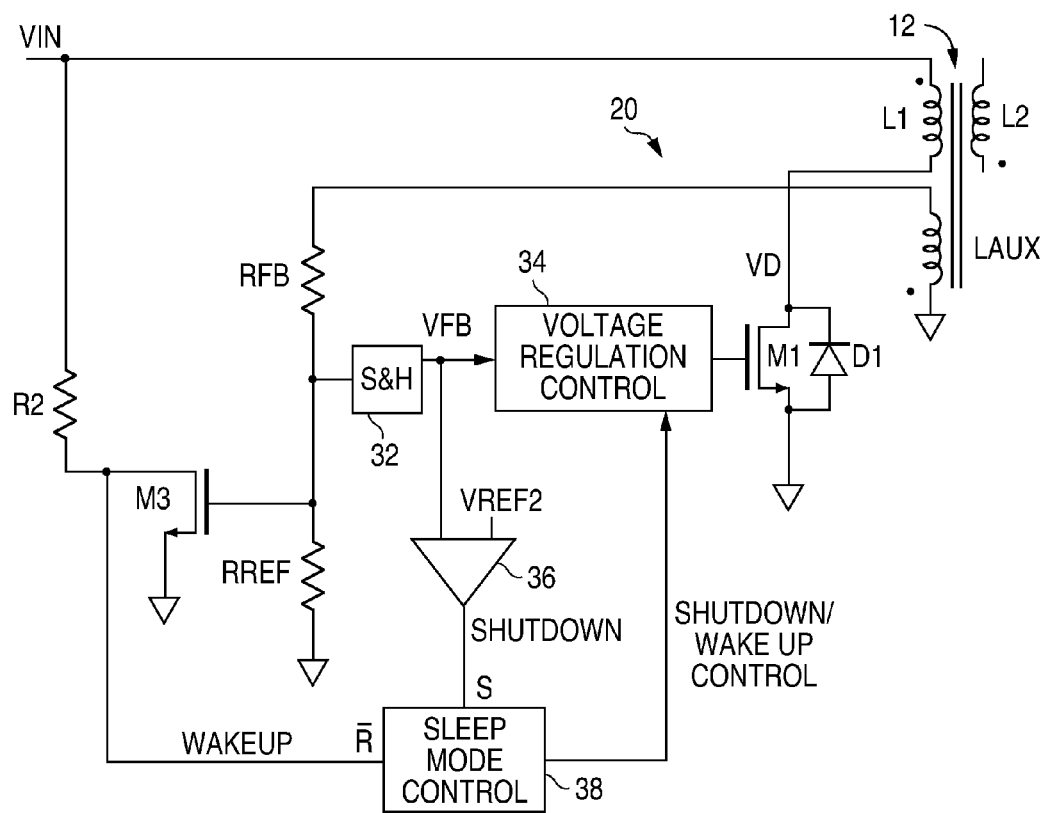
FIG. 5 illustrates the use of an auxiliary winding to sense the output voltage and the wakeup pulse.

In another embodiment, an auxiliary winding on the input side of the transformer is used to detect VOUT and the pulse generated by the turning on and off of the MOSFET M2. FIG. 5 illustrates an embodiment of the auxiliary winding LAUX. A resistor divider consisting of resistors RFB and RREF provides a voltage corresponding to VOUT for primary side sensing. This voltage is provided to the sample & hold circuit 32, which generates a feedback voltage VFB for controlling the duty cycle of the MOSFET M1 or its peak current, as previously described, to generate a regulated voltage. The feedback voltage VFB is provided to the sleep mode comparator 36, as previously described. The wakeup pulse generated at resistor RREF generates a reset pulse for the sleep mode control latch 38 also as previously described.

The regulation may use any other type of primary side sensing.

The sleep mode operation of the converter 20 may also be considered a hysteretic voltage mode, since VOUT swings between two thresholds, or a bang-bang controller since the converter 20 turns on for short periods then turns off. The sleep mode may also be considered a burst mode, since a burst of pulses periodically occurs to ramp up VOUT.

The MOSFETs may instead be bipolar transistors.

Figure 6:
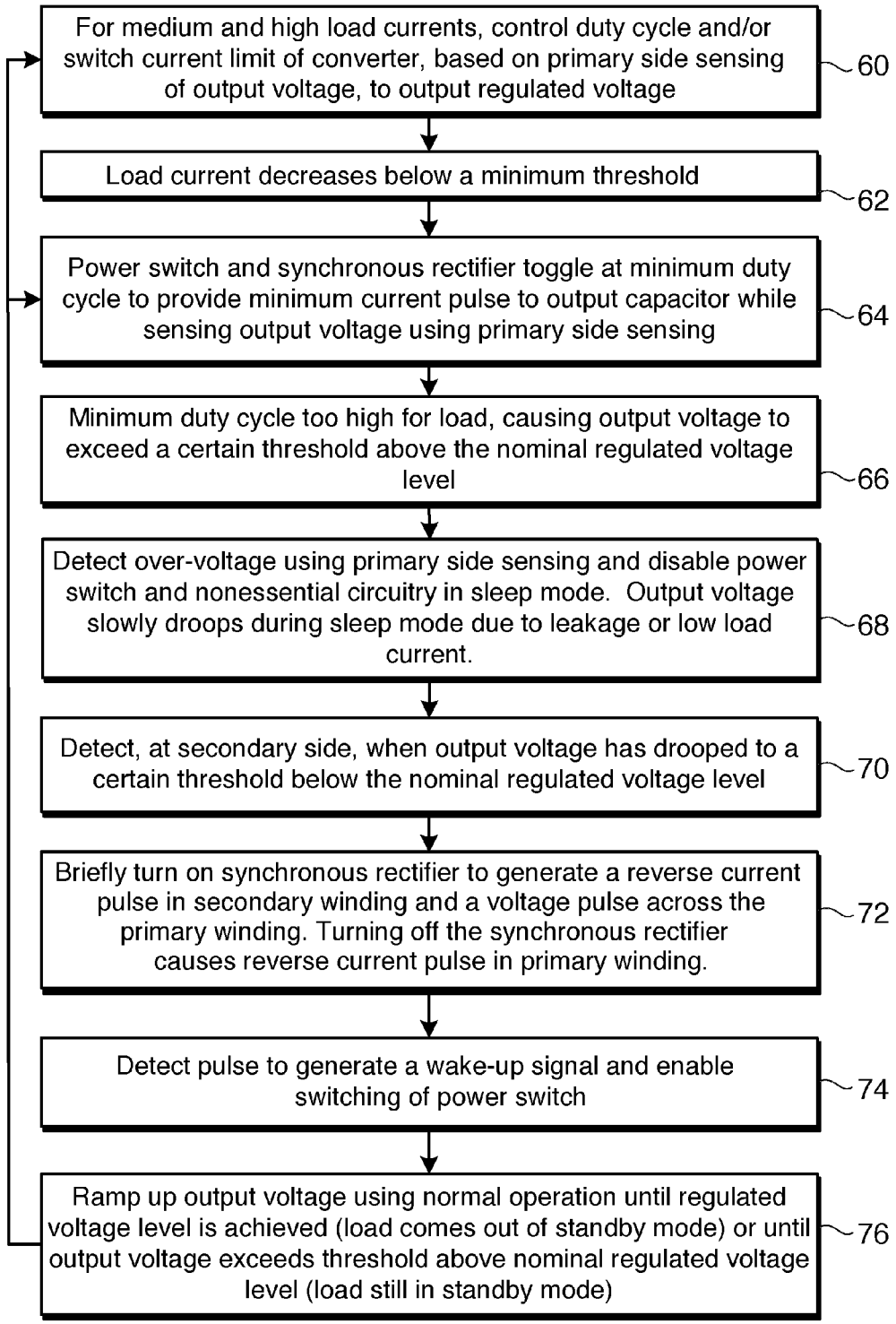
FIG. 6 is a flowchart identifying various events occurring during use of the invention.

FIG. 6 is a flowchart illustrating various steps performed by one embodiment of the invention.

In step 60, it is assumed the converter 20 is operating normally by varying the duty cycle and/or a switch current limit to achieve a regulated voltage using primary side sensing.

In step 62, the load current decreases below a minimum current delivered by the converter 20, such as by the load entering a standby mode or being disconnected.

In step 64, the converter operates at a minimum duty cycle while sensing the output voltage using primary side sensing.

In step 66, the output voltage rises above a certain threshold above the nominal regulated voltage level due to the minimum duty cycle still being too high for the load current.

In step 68, the over-voltage is sensed by the primary side sensing, and the power switch circuitry and any non-essential circuitry is disabled to initiate a sleep mode. The output voltage then slowly droops.

In step 70, it is detected at the secondary side that the output voltage has drooped below a certain level below the nominal regulated voltage level.

In step 72, the synchronous rectifier is briefly turned on to generate a reverse current pulse, which generates a voltage pulse above VIN at node VD in the primary winding. A reverse current pulse is also generated in the primary winding, which may be sensed instead of the voltage pulse.

In step 74, the pulse (either voltage or current) is detected to generate a wake-up signal. The wake-up signal enables the power switch circuitry, to initiate normal operation of the converter.

In step 76, the output voltage is ramped up until the regulated voltage level is reached. If the load current is still below the minimum delivered by the converter 20, the minimum duty cycle incrementally increases the output voltage to exceed the certain threshold above the nominal regulated voltage level, and the sleep mode occurs again. If the load comes out of the standby mode, the duty cycle of the converter (or peak switch current) will be adjusted to maintain a regulated voltage.

Those skilled in the art may design the various functional blocks in many ways without undue experimentation and using conventional circuit techniques.

While particular embodiments of the present invention have been shown and described, it will be obvious to those skilled in the art that changes and modifications may be made without departing from this invention in its broader aspects. The appended claims are to encompass within their scope all such changes and modifications as fall within the true spirit and scope of this invention.

What is claimed is:

1. A method for operating a flyback converter, the converter having a transformer with a primary winding and a secondary winding, the primary winding being coupled to a power source and a first transistor for conducting a current through the primary winding when the first transistor is on, the secondary winding being coupled to a second transistor for conducting a current through the secondary winding when the second transistor is on, the converter using primary side sensing to sense an output voltage, the converter having a minimum duty cycle, the method comprising:

sensing the output voltage using primary side sensing;

for load currents below a threshold current, turning on the first transistor for a first interval at the minimum duty cycle to draw a current through the primary winding;

turning on the second transistor after the first transistor has turned off to draw a current through the secondary winding to charge an output capacitor;

detecting whether the output voltage has exceeded a predetermined regulated voltage by a first threshold to detect an over-voltage condition, resulting from a current generated by the converter exceeding the load current;

if the over-voltage condition is detected, disabling at least the first transistor to cause the converter to enter a sleep mode, whereby the output voltage droops over a period of time;

while in the sleep mode, detecting that the output voltage has drooped below the predetermined regulated voltage by a second threshold;

upon detecting that the output voltage has drooped below the predetermined regulated voltage by the second threshold, turning the second transistor on, then off, to generate a pulse in the primary winding;

detecting the pulse in the primary winding; and upon detecting the pulse in the primary winding, controlling the converter to come out of the sleep mode by enabling the first transistor to switch at a duty cycle to raise the output voltage until a regulated voltage is achieved or until the first threshold is again exceeded by the output voltage.

2. The method of claim 1 wherein the step of detecting whether the output voltage has exceeded a predetermined regulated voltage by a first threshold to detect an over-voltage condition comprises detecting the output voltage using the primary side sensing.

3. The method of claim 1 wherein the step of turning the second transistor on, then off, to generate a pulse in the primary winding comprises turning the second transistor on for a fixed interval.

4. The method of claim 1 wherein the step of turning the second transistor on, then off, to generate a pulse in the primary winding comprises turning the second transistor on until a current through the second transistor reaches a threshold current.

5. The method of claim 1 wherein the pulse in the primary winding comprises a voltage pulse at a node between the primary winding and the first transistor.

6. The method of claim 1 wherein the pulse in the primary winding comprises a current pulse through the primary winding.

7. The method of claim 1 wherein the primary side sensing comprises detecting a voltage at an end of the primary winding during a sampling time.

8. The method of claim 1 wherein the primary side sensing comprises detecting a voltage generated by an auxiliary winding during a sampling time.

9. The method of claim 1 wherein the step of detecting whether the output voltage has exceeded a predetermined regulated voltage by a first threshold to detect an over-voltage condition comprises applying a voltage sensed by the primary side sensing to a comparator, wherein an output of the comparator triggers the sleep mode.

10. The method of claim 9 wherein the output of the comparator is applied to a sleep mode latch, the method further comprising controlling the latch to be in a first state for entering the sleep mode by triggering the comparator, and controlling the latch to be in a second state to come out of the sleep mode when the pulse is detected in the primary winding.

11. The method of claim 9 wherein the output of the comparator triggers a state machine that controls a sleep mode routine.

12. The method of claim 1 further comprising controlling a duty cycle of the first transistor to achieve the regulated voltage when the load current is above a minimum current that the converter can deliver.

13. The method of claim 1 wherein the first transistor is a first MOSFET having a drain-body diode that conducts current during the pulse in the primary winding.

14. The method of claim 1 wherein the step of turning on the second transistor after the first transistor has turned off to draw a current through the secondary winding comprises the second transistor being controlled to turn on and off by detecting a signal from the secondary winding.

15. The method of claim 1 wherein the step of detecting that the output voltage has drooped below the predetermined regulated voltage by the second threshold comprises comparing a voltage corresponding to the output voltage to a reference voltage.

16. The method of claim 1 further comprising detecting whether the output voltage has drooped below the predetermined regulated voltage by the second threshold is due to a low load current or due to the converter not supplying sufficient current to the load, wherein, if the droop is due to a low load current, then turning the second transistor on, then off, to generate a pulse in the primary winding.

17. A flyback converter comprising:
a transformer with a primary winding and a secondary winding, the primary winding being coupled to a power source;
a first transistor coupled to the primary winding for conducting a current through the primary winding when the first transistor is on;
a second transistor for conducting a current through the secondary winding when the second transistor is on;
a regulator coupled to the first transistor for controlling a duty cycle of the first transistor to regulate an output voltage of the converter when a load current is above a current threshold;
an output voltage sensor circuit coupled to the transformer for sensing an output voltage of the converter using primary side sensing;
a second transistor control circuit coupled to the second transistor for controlling the second transistor to be on or off;
a first detector coupled to the output voltage sensor circuit configured for detecting that the output voltage has exceeded a predetermined regulated voltage by a first threshold to detect an over-voltage condition, resulting from a current generated by the converter exceeding the load current;
a sleep mode circuit coupled to the first detector configured for disabling at least the first transistor in a sleep mode if the over-voltage condition is detected, whereby the output voltage droops over a period of time;
a second detector configured to detect that the output voltage has drooped below the predetermined regulated voltage by a second threshold, and, in response to such detecting, turning the second transistor on, then off, to generate a pulse in the primary winding; and
a pulse detector configured to detect the pulse in the primary winding and, in response to such detection, control the converter to come out of the sleep mode by enabling the first transistor to switch at a duty cycle to raise the output voltage until a regulated voltage is achieved or until the first threshold is again exceeded by the output voltage.

18. The converter of claim 17 wherein the pulse in the primary winding comprises a voltage pulse at a node between the primary winding and the first transistor, and the pulse detector detects the voltage pulse.

19. The converter of claim 17 wherein the pulse in the primary winding comprises a current pulse through the primary winding, and the pulse detector detects the current pulse.

20. The converter of claim 17 wherein the sleep mode circuit comprises a latch having a first state that initiates the sleep mode and having a second state that terminates the sleep mode when the pulse is detected in the primary winding.

21. The converter of claim 17 wherein the first detector is a comparator coupled to compare an output of the output voltage sensor circuit to a reference voltage.

22. The converter of claim 17 wherein the second detector is a comparator coupled to compare a voltage corresponding to the output voltage to a reference voltage.

23. A method for operating a flyback converter at load currents below a threshold current, the converter having a transformer with a primary winding and a secondary winding, the primary winding being coupled to a power source and a first transistor for conducting a current through the primary winding when the first transistor is on, the secondary winding being coupled to a second transistor for conducting a current through the secondary winding when the second transistor is on, the converter using primary side sensing to sense an output voltage, the method comprising:
detecting whether the output voltage has exceeded a predetermined regulated voltage by a first threshold to detect an over-voltage condition, resulting from a current generated by the converter exceeding the load current;
if the over-voltage condition is detected, disabling at least the first transistor to cause the converter to enter a sleep mode, whereby the output voltage droops over a period of time;
while in the sleep mode, detecting that the output voltage has drooped below the predetermined regulated voltage by a second threshold;
upon detecting that the output voltage has drooped below the predetermined regulated voltage by the second threshold, turning on and off the second transistor to generate a pulse in the primary winding;
sensing the pulse; and
in response to sensing the pulse, controlling the converter to come out of the sleep mode by enabling the first transistor to switch to raise the output voltage until a regulated voltage is achieved or until the first threshold is again exceeded by the output voltage.

24. The method of claim 23 wherein the pulse in the primary winding comprises a voltage pulse at a node between the primary winding and the first transistor.

25. The method of claim 23 wherein the pulse in the primary winding comprises a current pulse through the primary winding.

* * * * *